ELECTRO-PNEUMATIC AND PNEUMATIC-ELECTRIC BINARY CONVERTER

Filed April 11, 1967

INVENTORS
HEINZ TOPFER
EBERHARD MILKE

United States Patent Office 3,457,384

Patented July 22, 1969

3,457,384

ELECTRO-PNEUMATIC AND PNEUMATIC-ELECTRIC BINARY CONVERTER

Heinz Topfer and Eberhard Milke, Dresden, Germany, assignors to Veb Reglerwerk Dresden, Dresden, Germany Filed Apr. 11, 1967, Ser. No. 629,949
Int. Cl. H01h 35/34
U.S. Cl. 200—83 7 Claims

ABSTRACT OF THE DISCLOSURE

A pneumatic-electric binary converter for closing an electrical circuit to enable the production of an electrical indication under the control of a pneumatic signal is disclosed in three embodiments. Each embodiment comprises an open electrical circuit. A connector connected to the open electrical circuit closes the electrical circuit when actuated to enable the production of an electrical indication in such circuit. A pressure-responsive device is positioned in operative proximity with the connector whereby an increase in pressure in the pressure-responsive device actuates the connector to close the electrical circuit.

An electro-pneumatic binary converter for producing a pneumatic signal under the control of electrical energy is disclosed in two embodiments. Each embodiment comprises a pressure-responsive device. A control device varies the pressure of the pressure-responsive device to produce a pneumatic signal. An electrically energized device is positioned in operative proximity with the control device for actuating the control device to vary the pressure of the pressure-responsive device.

BACKGROUND OF THE INVENTION

A. Field of the invention

The present invention relates to an electro-pneumatic and pneumatic-electric binary converter. More particularly, the invention relates to an electro-pneumatic and pneumatic-electric binary converter or transducer which may be utilized as a switching element in digital control systems and regulating devices for the direct conversion or transformation of electric to pneumatic signals and pneumatic to electric binary signals.

B. Description of the prior art

Known electro-pneumatic binary converters perform electro-pneumatic switching functions. The best known component of known converters of such type is the magnetic valve. Other components function in accordance with the principle of the electromagnetic relay. Furthermore, known electro-pneumatic relay components of electro-pneumatic regulators convert electric signals to pneumatic signals.

Known pneumatic-electric binary converters perform or assist in performing pneumatic-electric switching functions. Converters of such type include contact manometers and pressure or toggle switches. Contact manometers are normal manometers with electric taps and pressure or toggle switches are pneumatic or hydraulic devices which are specifically developed for switching functions and which include an electric microswitch.

Known types of electro-pneumatic and pneumatic-electric binary converters cannot be installed directly in logical switching elements since such converters are too large in size and are too complicated and complex in structure. Furthermore, such known converters require extensive supply or lead-in wiring, which results in unreliable switching operations with long switching periods and/or auxiliary devices and equipment which are highly susceptible to interferences and are expensive to manufacture.

SUMMARY OF THE INVENTION

The principal object of the present invention is to provide a new and improved electro-pneumatic and pneumatic-electric binary converter. The electro-pneumatic and pneumatic-electric binary converter of the present invention overcomes the disadvantages of the electro-pneumatic and pneumatic-electric converters of known type and are of small size, simple structure and simple supply or lead-in wiring and do not require auxiliary devices. The electro-pneumatic and pneumatic-electric converter of the present invention may be utilized as a switch unit in digital control and regulating systems for the direct conversion of electric signals to pneumatic signals and pneumatic signals to electric binary signals. The electro-pneumatic and pneumatic-electric converter of the present invention functions efficiently, effectively and reliably, is inexpensive in manufacture and use, provide rapid switching operation and rapid conversion of binary signals.

In accordance with the present invention, a pneumatic-electric binary converter for closing an electrical circuit to enable the production of an electrical indication under the control of a pneumatic signal comprises an open electrical circuit. A connector is connected to the open electrical circuit for closing the electrical circuit when actuated to enable the production of an electrical indication therein. A pressure-response device is positioned in operative proximity with the connector whereby an increase in pressure in the pressure-responsive device actuates the connector to close the electrical circuit.

Also in accordance with the present invention, an electro-pneumatic binary converter for producing a pneumatic signal under the control of electrical energy comprises a pressure-responsive device. A control device varies the pressure of the pressure-responsive device to produce a pneumatic signal. An electrically energized device is positioned in operative proximity with the control device for actuating the control device to vary the pressure of the pressure-responsive device. The pressure-responsive device preferably comprises a double diaphragm relay and the electrically energized device preferably comprises an electromagnet.

A first embodiment of a pneumatic-electric binary converter of the present invention for closing an electrical circuit between a pair of electrical terminals to enable the production of an electrical indication under the control of a pneumatic signal comprises a double diaphragm relay including a diaphragm chamber and a diaphragm in the chamber. An electrically conductive support plate is affixed to and movable with the diaphragm in the chamber. A first electrical contact is affixed to the support plate in the chamber. A second electrical contact is affixed in spaced relation from the first electrical contact in the chamber. A first electrical terminal is electrically connected to the second electrical contact. A second electrical terminal is provided. An electrically conductive compression spring is interposed between and in electrical connection with the second electrical terminal and the support plate in the chamber whereby an increase in pressure in the double diaphragm relay moves the diaphragm toward the second electrical contact against the force of the spring thereby closing an electrical circuit between the electrical terminals by moving the first electrical contact into electrical contact with the second electrical contact.

A second embodiment of a pneumatic-electric binary converter of the present invention for enabling the production of an electrical indication under the control of a pneumatic signal comprises a housing having a hollowed-out central area. A microswitch is positioned in the hollowed-out central area for enabling the production of an electrical indication when actuated. A piston in the hollowed-out central area is mechanically coupled to the microswitch for actuating the microswith. A pneumatic input passes through the housing into the hollowed-out central area thereof in operative proximity with the piston whereby the application of an increase in pressure to the piston moves the piston toward the microswitch to actuate the microswitch thereby enabling the production of an electrical indication.

A third embodiment of a pneumatic-electric binary converter of the present invention of closing an electrical circuit between a pair of electrical contacts to enable the production of an electrical indication under the control of a pneumatic signal comprises a diaphragm relay including a diaphragm chamber and a diaphragm in the chamber. A pair of electrical contacts are insulatedly mounted in spaced adjacent relation to each other. One of the electrical contacts is a spring contact movable under pressure. A rod is affixed at one end to the diaphragm in the chamber and extends at its other end into close proximity with the one of the electrical contacts, the rod being movable with the diaphragm in the chamber. A compression spring is fixedly mounted at one end and abuts the diaphragm at the other end and urges the diaphragm in a direction away from the one of the electrical contacts whereby an increase in pressure in the diaphragm relay moves the diaphragm toward the one of the electrical contacts against the force of the spring thereby closing an electrical circuit between the electrical contacts by moving the rod into abutment with the one of the electrical contacts to move the one of the electrical contacts into electrical contact with the other of the electrical contacts.

A first embodiment of an electro-pneumatic binary converter of the present invention for producing a pneumatic signal under the control of electrical energy comprises a double diaphragm relay including a diaphragm chamber and a diaphragm in the chamber. A magnetizable plate is affixed to and movable with the diaphragm in the chamber. An electromagnet has a core having a head portion in the chamber in operative proximity with the magnetizable plate and an electrically conductive winding wound around the core whereby energization of the electromagnet by electrical energy supplied to the winding magnetizes the head portion of the core and attracts the magnetizable plate to the head portion thereby moving the diaphragm toward the electromagnet and causing the double diaphragm relay to produce a pneumatic signal.

A second embodiment of an electro-pneumatic binary converter of the present invention for producing a pneumatic signal under the control of electrical energy comprises a double diaphragm relay including a diaphragm chamber and a diaphragm in the chamber. A ventilating duct extends from the chamber. A magnetizable plate covers the ventilating duct outside the chamber. A compression spring is fixedly mounted at the one end and abuts the magnetizable plate at its other end to maintain the magnetizable plate over the ventilating duct. An electromagnet has a core having a head portion in operative proximity with the magnetizable plate and an electrically conductive winding wound around the core whereby energization of the electromagnet by electrical energy supplied to the winding magnetizes the head portion of the core and attracts the magnetizable plate to the head portion thereby uncovering the ventilating duct and causing the double diaphragm relay to produce a pneumatic signal.

The second embodiment of the electro-pneumatic binary converter of the present invention may further comprise a valve for the double diaphragm relay and a chamber between the double diaphragm relay and the electromagnet for providing positive and negative pressure signals.

BRIEF DESCRIPTION OF THE DRAWING

In order that the present invention may be readily carried into effect, it will now be described with reference to the accompanying drawing wherein.

DESCRIPTION OF THE PREFERRED EMBODIMENTS

Figures 1, 2:
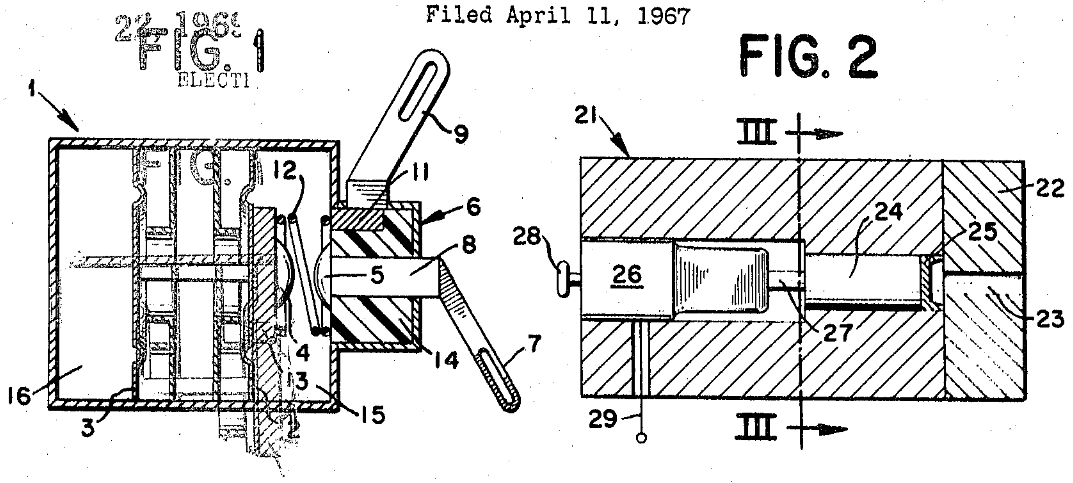
FIG. 1 is a schematic diagram, partly in section, of an embodiment of the pneumatic-electric binary converter of the present invention.
FIG. 2 is a schematic sectional diagram of another embodiment of the pneumatic-electric binary converter of the present invention.

In FIG. 1, which is a first embodiment of the pneumatic-electric binary converter of the present invention, a twin or double diaphragm relay 1 has two diaphragms 2 and 3. The double diaphragm relay which can be used with the present invention is more fully described in a copending application Ser. No. 479,533 filed Aug. 13, 1965 and assigned to the same assignee as the present application. An electrical contact 4 is affixed to and moves with the diaphragm 2. Another electrical contact 5 is affixed to an electrical terminal box 6 in spaced relation from the electrical contact 4. The electrical terminal box 6 is affixed to the housing of the double diaphragm relay 1.

The electrical terminal box 6 comprises a first electrical terminal 7 electrically connected to the contact 5 via an electrical connector 8 and a second electrical terminal 9 electrically connected to the contact 4 via an electrical connector 11, an electrically conductive spring 12 and the support plate 13 for such contact 4. The electrical connectors 8 and 11 are electrically insulated from each other by electrical insulation 14 which fills the electrical terminal box 6. The spring 12 comprises a compression spring and is positioned in the diaphragm chamber 15 between the diaphragm 2 and the electrical terminal box 6.

In the embodiment of FIG. 1, when compressed air or gas under pressure is supplied to the diaphragm chamber 16, via any suitable means not shown in FIG. 1, the diaphragm 2 is moved, against the force of the spring 12, toward the electrical terminal box 6 and the electrical contact 4 is moved into electrical contact with the electrical contact 5. When the electrical contacts 4 and 5 are in electrical contact with each other they close the electrical circuit between the electrical terminals 7 and 9 enabling the production of an electrical indication in a circuit connected to said electrical terminals. Diminishing of pressure in chamber 16 or supply of pressure to chamber 15 results in restoring of the contacts to their open position.

Figure 3:
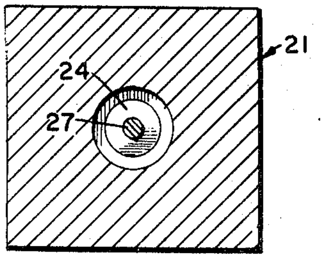
FIG. 3 is a view taken along the lines III—III of FIG. 2.

In FIGS. 2 and 3, which are a second embodiment of the pneumatic-electric binary converter of the present invention, a housing 21 has an end portion 22 affixed thereto. The end portion 22 has a pressure conduit 23 formed therethrough. The housing 21 has a hollowed-out central area which accommodates a piston 24 having a sleeve portion 25. A microswitch 26 is positioned in the hollowed-out central area of the housing 21 and is mechanically coupled to the piston 24 via a rod 27. The microswitch 26 is connected into an electrical circuit via an electrical connector 28 and an electrical conductor 29.

When compressed air or gas under pressure is supplied to the hollowed-out central area of the housing 21 via the conduit 23, it moves the piston 24 toward the microswitch 26 thereby closing said microswitch via the rod 27. The microswitch 26 is connected in an electrical circuit (not shown in FIGS. 2 and 3) which is closed by said microswitch, enabling the production of an electrical indication therein.

Figure 4:
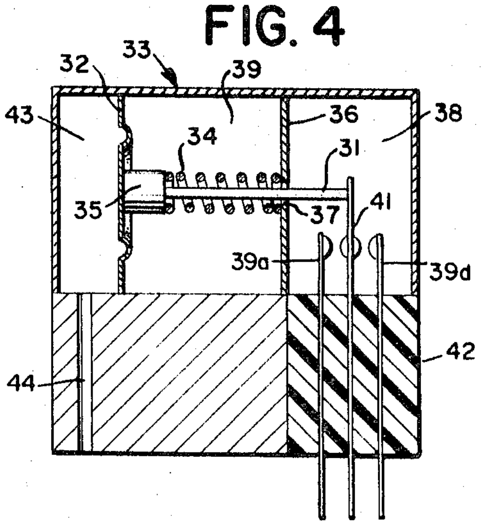
FIG. 4 is a schematic diagram, partly in section, of still another embodiment of the pneumatic-electric binary converter of the present invention.

In FIG. 4, which is a third embodiment of the pneumatic-electric binary converter of the present invention, a rod 31 is affixed at one end to the diaphragm 32 of a diaphragm relay 33, such as described in the above-mentioned co-pending application, and moves with said diaphragm. The rod 31 is maintained in the position shown in FIG. 4 by a compression spring 34 which abuts the rod support 35 at one end and at its other end abuts a partition 36. The partition 36 has an aperture 37 formed therethrough through which the rod 31 extends.

The rod 31 extends at its other end into an electrical switch box 38. The electrical switch box 38 is affixed to the diaphragm relay 33 and comprises a pair of end electrical contacts 29*a* and 39*b* and a central electrical insulation 42. The electrical contact 41 is a spring contact and is affixed to the end of the rod 31 in the switch box 38 or is abutted by said rod.

When compressed air or gas under pressure is supplied to the diaphragm chamber 43, via any suitable means such as a duct 44 in FIG. 4, the diaphragm 32, and therefore the rod 31, is moved, against the force of the spring 34, toward the electrical switch box 38 and the central electrical contact 41 is moved by said rod into electrical contact with the end electrical contact 39*b*. When the electrical contacts 41 and 39*b* are in electrical contact with each other, they close an electrical circuit, connected to said electrical contacts, but not shown in FIG. 4, enabling the production of an electrical indication therein. Of course, if pressure is supplied to chamber 39 by means not shown in FIG. 4, diaphragm 32 and rod 31 therewith deflects to the left and causes closing of contacts 41 and 39*a* enabling the production of an electrical indication at the respective terminals of such contacts.

Figure 5:
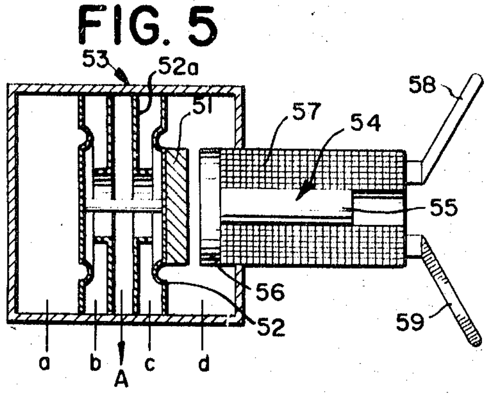
FIG. 5 is a schematic diagram, partly in section, of an embodiment of the electro-pneumatic binary converter of the present invention.

In FIG. 5, which is a first embodiment of the electro-pneumatic binary converter of the present invention, a magnetizable control plate 51, such as iron, is affixed to a diaphragm 52 of a double diaphragm relay 53 of the above-mentioned co-pending application and moves with said diaphragm. An electromagnet 54 is affixed to the housing of the double diaphragm relay 53. The electromagnet 54 comprises a core 55 having a head portion 56 in spaced relation with the plate 51 and an electrically conductive winding 57 wound around said core. Electrical terminals 58 and 59 are electrically connected to the ends of the electrically conductive winding 57.

When electrical energy is supplied to the winding 57 via the electrical terminals 58 and 59, the electromagnet 54 is energized and the head portion 56 of its core 55 attracts the magnetizable plate 51. The attraction and movement of the plate 51 toward the core 55 of the electromagnet 54 moves the diaphragm 52 toward said core and releases the double diaphragm relay by releasing the contact of diaphragm 52 with the annular wall 52*a* as described in the aforementioned co-pending application. Thereby producing a pneumatic or pressure output signal, as shown with the arrow A. With lowercase letters *a*, *b*, *c* and *d* inputs and outputs are designated which can be seen in more detail in the above-mentioned application.

Figure 6:
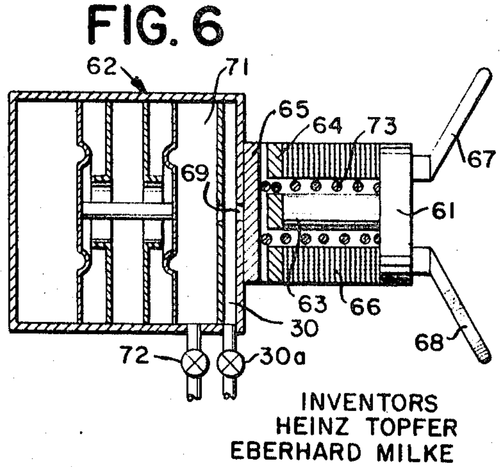
FIG. 6 is a schematic diagram, partly in section, of another embodiment of the electro-pneumatic binary converter of the present invention.

In FIG. 6, which is a second embodiment of the electro-pneumatic binary converter of the present invention, an electromagnet 61 is affixed to a double diaphragm relay 62 of the type described in the above-mentioned co-pending application. The electromagnet 61 comprises a core 63 having a head portion 64 in spaced relation with a magnetizable plate 65, such as iron, and an electrically conductive winding 66 wound around said core. Electrical terminals 67 and 68 are electrically connected to the ends of the electrically conductive winding 66.

A ventilating control duct 69 is formed through a wall between the diaphragm chamber 71 of the double diaphragm relay 62 and the magnetizable plate 65. A valve 72 opens into the diaphragm chamber 71. The ventilating conduit 69 is blocked by a compression spring 73, which urges the magnetizable plate 65 against the opening of said ventilating conduit on the electromagnet side. When the electromagnet 61 is deenergized, the magnetizable plate 65 is held against the opening of the ventilating conduit 69 by the spring 73. The spring 73 is positioned around the core 63 and abuts the core at one end and the magnetizable plate 65 at the other end. The spring 73 passes through apertures formed through the head portion 64 of the core 63 of the electromagnet 61.

When electrical energy is supplied to the winding 66 via the electrical terminals 67 and 68, the electromagnet 67 is energized and the head portion 64 of its core 63 attracts the magnetizable plate 65. The attraction and movement of the plate 65 toward the core 63 of the electromagnet 61 removes said plate from the opening of the ventilating conduit or duct 69 and thereby opens said ventilating conduit and releases the double diaphragm relay, thereby producing a pneumatic or pressure output signal.

The energization of the electromagnet 61 of the embodiment of the present invention of FIG. 6 may produce either a positive or a negative pneumatic or pressure output signal. The positive or negative nature of the pneumatic output signal is determined by whether compressed air or gas under pressure passes through the valve 72 or through another valve 30*a* into another chamber than the diaphragm chamber 71 of the double diaphragm relay 62. Such other chamber may comprise, for example, a precontrol chamber 30 positioned between the diaphragm chamber 71 and the electromagnet 61.

The pneumatic or pressure output signals produced by the electro-pneumatic binary converter of FIG. 5 or FIG. 6 provide different logical switching operations.

While the invention has been described by means of specific examples and in specific embodiments, we do not wish to be limited thereto, for obvious modification will occur to those skilled in the art without departing from the spirit and scope of the invention.

What is claimed is:

1. A pneumatic-electric binary converter for closing an electrical circuit to enable the production of an electrical indication under the control of a pneumatic signal, said pneumatic-electric binary converter comprising; electrical switch means having an electrical circuit connected thereto; pressure-responsive means in operative proximity with said switch means, said pressure-responsive means comprising a double diaphragm relay including a diaphragm chamber and a diaphragm in said chamber, an electrically conductive support plate affixed to and movable with said diaphragm in said chamber, said switch means comprises a first electrical contact affixed to said support plate in said chamber, and a second electrical contact affixed in spaced relation from said first electrical contact in said chamber, and said electrical circuit comprises a first electrical terminal electrically connected to said second electrical contact and a second electrical terminal, and further comprising an electrically conductive compression spring interposed between and in electrical connection with said second electrical terminal and said support plate in said chamber whereby an increase in pressure in said double diaphragm relay moves said diaphragm toward said second electrical contact against the force of said spring thereby closing an electrical circuit between said electrical terminals by moving said first electrical contact into electrical contact with said second electrical contact.

2. A pneumatic-electric binary converter for closing an electrical circuit to enable the production of an electrical indication under the control of a pneumatic signal, said pneumatic-electric binary converter comprising; electrical switch means having an electrical circuit connected thereto; pressure-responsive means in operative proximity with said switch means, a housing having a hallowed-out central area, said switch means being positioned in said hollowed-out central area, for enabling the production of an electrical indication when actuated and said pressure-responsive means comprises a piston in said hollowed-out central area mechanically coupled to said switch means for actuating said switch means and pneumatic input means passing through said housing into the hollowed-out central area thereof in operative proximity with said piston whereby the application of an increase in pressure to said piston moves said piston toward said switch means to actuate said switch means thereby enabling the production of an electrical indication.

3. An electro-pneumatic binary converter for producing a pneumatic signal under the control of electrical energy, said electro-pneumatic binary converter comprising pressure-responsive means; control means for varying the pressure of said pressure-responsive means to produce a pneumatic signal; and electrically energized means in operative proximity with said control means for actuating said control means to vary the pressure of said pressure-responsive means.

4. An electro-pneumatic binary converter as claimed in claim 3, wherein said pressure-responsive means comprises a double diaphragm relay and said electrically energized means comprises an electromagnet.

5. An electro-pneumatic binary converter as claimed in claim 3, wherein said pressure-responsive means comprises a double diaphragm relay including a diaphragm chamber and a diaphragm in said chamber, said control means comprises a magnetizable plate affixed to and movable with said diaphragm in said chamber, and said electrically energized means comprises an electromagnet having a core having a head portion in said chamber in operative proximity with said magnetizable plate and an electrically conductive winding wound around said core whereby energization of said electromagnet by electrical energy supplied to said winding magnetizes the head portion of said core and attracts said magnetizable plate to said head portion thereby moving said diaphragm toward said electromagnet and causing said double diaphragm relay to produce a pneumatic signal.

6. An electro-pneumatic binary converter as claimed in claim 3, wherein said pressure-responsive means comprises a double diaphragm relay including a diaphragm chamber and a diaphragm in said chamber, said control means comprises a ventilating duct extending from said chamber and a magnetizable plate covering said ventilating duct outside said chamber and a compression spring fixedly mounted at one end and abutting said magnetizable plate at its other end to maintain said magnetizable plate over said ventilating duct, and said electrically energized means comprises an electromagnet having a core having a head portion in operative proximity with said magnetizable plate and an electrically conductive winding wound around said core whereby energization of said electromagnet by electrical energy supplied to said winding magnetizes the head portion of said core and attracts said magnetizable plate to said head portion thereby uncovering said ventilating duct and causing said double diaphragm relay to produce a pneumatic signal.

7. An electro-pneumatic binary converter as claimed in claim 6, further comprising a valve for said double diaphragm relay and a chamber between said double diaphragm relay and said electromagnet for providing positive and negative pressure signals.

References Cited

UNITED STATES PATENTS

| | | | |
|---|---|---|---|
| 2,136,504 | 11/1938 | Hilbert et al. | 200—83.5 |
| 2,537,474 | 6/1951 | Mejean | 200—83.1 XR |
| 2,656,431 | 10/1953 | Bochan | 200—83.3 |
| 3,055,994 | 9/1962 | Lundeen | 200—83.5 XR |
| 3,217,309 | 11/1965 | Parker | 200—83.5 XR |
| 3,267,233 | 8/1966 | Basile et al. | 200—83.8 |

ROBERT K. SCHAEFER, Primary Examiner

H. BURKS, Assistant Examiner

U.S. Cl. X.R.

200—82